(12) United States Patent
Lau

(10) Patent No.: US 7,673,924 B1
(45) Date of Patent: Mar. 9, 2010

(54) VEHICLE EXTERIOR WINDSHIELD PROTECTIVE COVER FOR PROTECTION AGAINST SUN, WIND, SNOW AND ICE

(76) Inventor: Kathy Lau, 3666 S. Pearl St., No. 4, Englewood, CO (US) 80113

( * ) Notice: Subject to any disclaimer, the term of this patent is extended or adjusted under 35 U.S.C. 154(b) by 166 days.

(21) Appl. No.: 11/899,906

(22) Filed: Sep. 8, 2007

(51) Int. Cl.
*B60J 1/20* (2006.01)

(52) U.S. Cl. ............................................. 296/95.1

(58) Field of Classification Search ........... 296/95.1, 296/136.07, 136.02, 136.08, 136.1, 136.13
See application file for complete search history.

(56) References Cited

U.S. PATENT DOCUMENTS

| | | | | |
|---|---|---|---|---|
| 2,064,393 A * | 12/1936 | Talbott | ................. | 160/65 |
| 2,065,242 A * | 12/1936 | Omerly, Jr. | ................. | 160/370.21 |
| 2,437,845 A * | 3/1948 | Wyeth | ................. | 160/183 |
| 2,599,066 A * | 6/1952 | Osborn | ................. | 160/370.21 |
| 3,021,894 A * | 2/1962 | La Due | ................. | 160/23.1 |
| 3,140,115 A * | 7/1964 | Bliss | ................. | 150/168 |
| 3,184,264 A * | 5/1965 | Ealey et al. | ................. | 296/95.1 |
| 3,874,437 A * | 4/1975 | Black | ................. | 160/370.21 |
| 4,768,823 A * | 9/1988 | Martinez | ................. | 296/95.1 |
| 4,799,728 A * | 1/1989 | Akers et al. | ................. | 296/136.04 |
| 4,811,982 A * | 3/1989 | Carlyle | ................. | 296/95.1 |
| 4,903,749 A * | 2/1990 | Hanania | ................. | 160/370.21 |
| 4,938,522 A * | 7/1990 | Herron et al. | ................. | 296/136.1 |
| 4,948,192 A * | 8/1990 | Sohne | ................. | 296/95.1 |
| 5,037,156 A * | 8/1991 | Lundberg | ................. | 296/95.1 |
| 5,102,183 A * | 4/1992 | Swartz | ................. | 296/136.1 |
| 5,292,167 A * | 3/1994 | Hellman | ................. | 296/95.1 |
| D348,242 S * | 6/1994 | Tsao | ................. | D12/401 |
| 5,328,230 A * | 7/1994 | Curchod | ................. | 296/136.04 |
| 5,490,707 A * | 2/1996 | De La Cruz | ................. | 296/95.1 |
| 5,879,044 A * | 3/1999 | Stufano | ................. | 296/95.1 |
| 5,954,384 A * | 9/1999 | Jones | ................. | 296/95.1 |
| 6,578,900 B1 * | 6/2003 | Riportella | ................. | 296/136.12 |
| 6,588,827 B2 * | 7/2003 | Heiland | ................. | 296/136.1 |
| 6,644,716 B1 * | 11/2003 | McNabb | ................. | 296/136.1 |
| 7,059,650 B1 * | 6/2006 | Wood | ................. | 296/95.1 |
| 7,290,826 B2 * | 11/2007 | Dempsey | ................. | 296/136.13 |
| 7,431,375 B1 * | 10/2008 | Julius | ................. | 296/95.1 |
| 2006/0214466 A1 * | 9/2006 | Davis | ................. | 296/136.11 |
| 2007/0085372 A1 * | 4/2007 | Dhanray | ................. | 296/136.07 |

* cited by examiner

*Primary Examiner*—H Gutman
(74) *Attorney, Agent, or Firm*—Edwin H. Crabtree; Ramon L. Pizarro

(57) ABSTRACT

An exterior vehicle windshield protective cover used to cover the outside of a vehicle front windshield. The protective cover reflects the sun's ray in the summer to help keep the vehicle cool and protect the windshield from snow and ice when the vehicle is parked outside. The protective cover includes a flexible exterior windshield cover member dimensioned to cover the exterior of a vehicle's windshield. The cover member includes a pair of flexible wings hinged along fold lines and attached to the sides of the cover member. The wings include a pair of elastic loops. When the front doors of the vehicle are opened, the wings are inserted inside the vehicle with the elastic loops attached to windshield visor posts for holding the cover member securely against the windshield in tension. A windshield wiper well cover is hinged along a fold line attached to the bottom of the cover member. The well cover is held in place on a portion of the vehicle's hood using a plurality of magnets. The well cover covers the windshield wipers in a wiper well and prevents snow and ice from gathering inside the wiper well.

11 Claims, 2 Drawing Sheets

U.S. Patent    Mar. 9, 2010    Sheet 2 of 2    US 7,673,924 B1
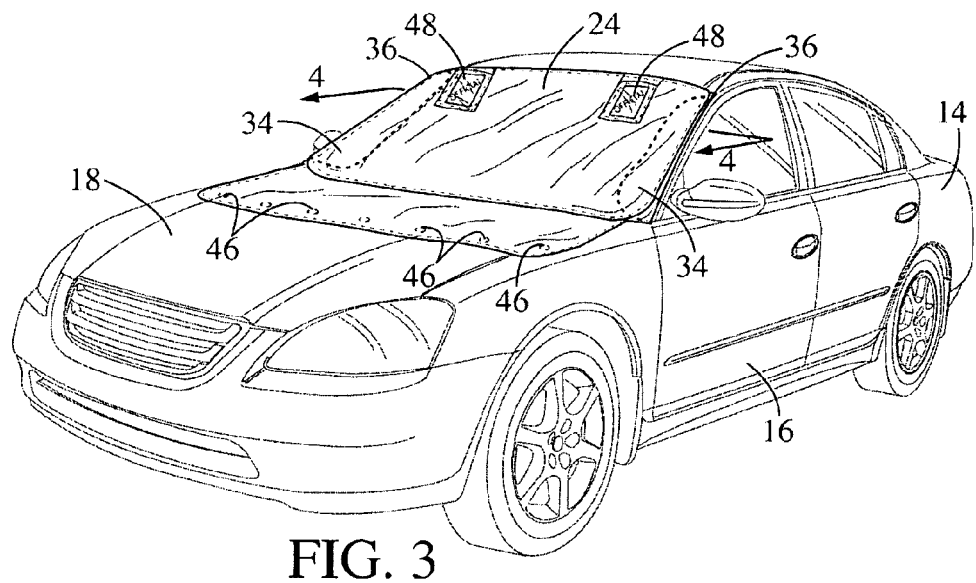
FIG. 3
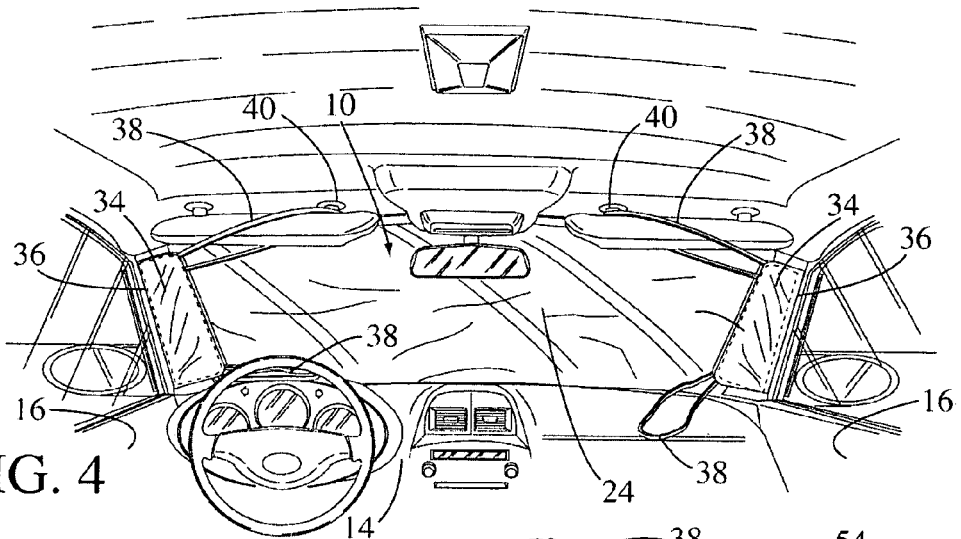
FIG. 4
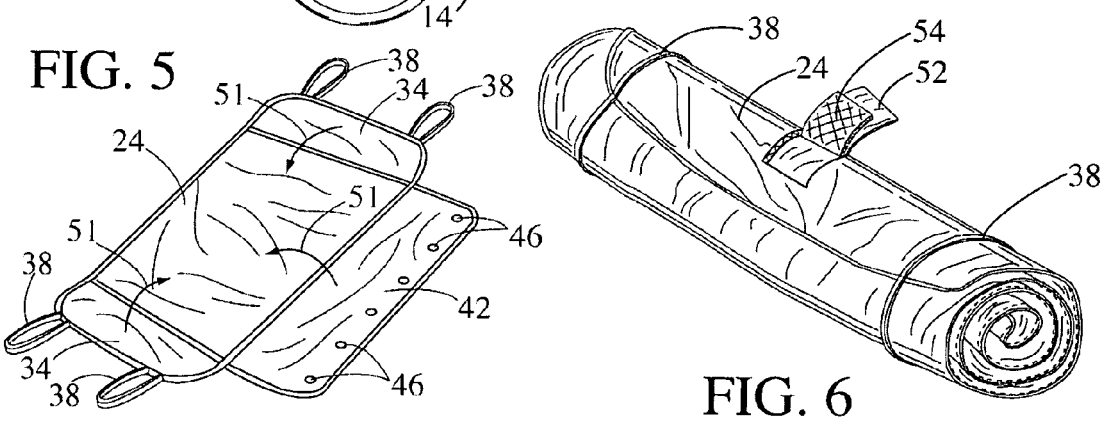
FIG. 5
FIG. 6

VEHICLE EXTERIOR WINDSHIELD PROTECTIVE COVER FOR PROTECTION AGAINST SUN, WIND, SNOW AND ICE

BACKGROUND OF THE INVENTION (a) Field of the Invention

This invention relates to a flexible, exterior, windshield protective cover for receipt on top of a vehicle's front windshield and more particularly, but not by way of limitation, to an all-year windshield protective cover that can be quickly secured to an exterior of the vehicle's front windshield for protection against sun, wind, snow and ice. The cover is dual purpose by helping keep the vehicle cooler in the summer and protecting the windshield from snow and ice in the winter, when the vehicle is parked outside.

(b) Discussion of Prior Art

Heretofore, there having been a number of different types of exterior windshield covers disclosed in U.S. Patents. In U.S. Pat. No. 5,037,156 to Lundberg a polyethylene sheet cover is disclosed for covering a windshield. The sheet cover includes wings with straps received inside a doorframe for holding the cover on an exterior of a front windshield. U.S. Pat. No. 2,599,066 to Osborn illustrates a fabric panel for covering a windshield and includes straps with suction cups received inside the vehicle for securing the panel to the outside of the windshield. Also, U.S. Pat. Nos. 4,811,982 to Carlyle, 3,874,437 to Black and 3,184,264 to Ealey et al. disclose three different types of windshield protectives and covers with different means for securing the covers to the exterior of the windshield. Further, U.S. Pat. Nos. 5,954,384 to Jones, 5,879,044 to Stufano, 4,799,728 to Akers et al., 4,768,823 to Martinez and 3,140,115 to Bliss all describe different types of detachable windshield protectives and covers for mounting on the exterior of a windshield.

While the above-mentioned patents describe and illustrate similar windshield covers, none of them specifically disclose the unique combination of structure, function and advantages of the subject vehicle exterior windshield protective cover as described herein.

SUMMARY OF THE INVENTION

In view of the foregoing, it is a primary objective of the subject invention to provide an exterior vehicle windshield protective cover that reflects the sun's ray in the summer to help keep the vehicle cool and protect the windshield from snow and ice when the vehicle is parked outside.

Another object of the invention is the cover can be quickly mounted on top of the windshield and securely held in tension thereon using a pair of flexible, foldable, interior wings received inside the vehicle and held next to the inside of the windshield using elastic loops secured to windshield visor posts.

Yet another object of the protective cover is a windshield wiper well cover used for covering the vehicle's windshield wipers and wiper well and preventing snow and ice from gathering therein. The wiper well cover includes a plurality of magnets for holding the well cover next to a portion of the hood of the vehicle.

The protective cover includes a flexible exterior windshield cover member dimensioned to cover the exterior of a vehicle's windshield. The cover member includes a top portion, a bottom portion and a first and second side portion. A pair of flexible wings are hinged along fold lines and attached to the first and second side portions of the cover member. The wings include a pair of elastic loops. When the front doors of the vehicle are opened, the wings are inserted inside the vehicle with the elastic loops attached to windshield visor posts for holding the cover member securely against the windshield in tension. A windshield wiper well cover is hinged along a fold line attached to the bottom portion of the cover member. The well cover is held in place on a portion of the vehicle's hood using a plurality of magnets. The well cover covers the windshield wipers in a wiper well and prevents snow and ice from gathering inside the wiper well.

These and other objects of the present invention will become apparent to those familiar with different types and designs of exterior and interior windshield protective covers when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which:

FIG. 3 is still another perspective view of the protective cover with a pair of foldable, interior wings received inside the vehicle. The interior wings include elastic loops for securing the protective cover to windshield visor posts.

FIG. 4 is a perspective view from inside the vehicle and illustrating the foldable wings with elastic loops holding the protective cover in tension on the windshield.

FIG. 5 is a perspective view illustrating how the hinged flexible wings and wiper well cover are folded on top of a cover member prior to winding the protective cover into a roll for storage.

FIG. 6 is a perspective view of the flexible protective cover wound into a compact roll and held in place using the elastic loops.

DETAILED DESCRIPTION OF THE PREFERRED EMBODIMENTS

Figure 1:
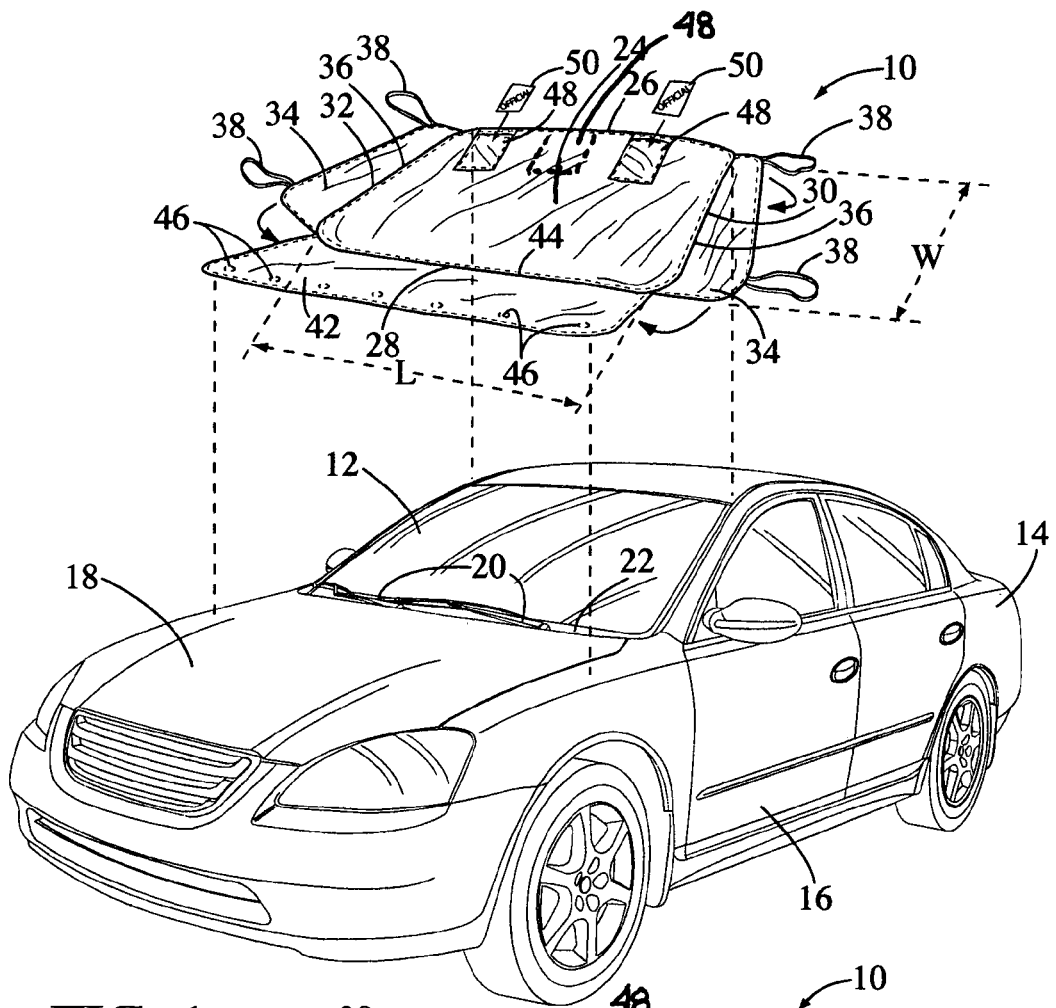
FIG. 1 is a perspective view of the subject vehicle exterior windshield protective cover shown positioned above a vehicle's front windshield and ready for attachment thereto.

In FIG. 1, a perspective view of the subject vehicle exterior windshield protective cover is shown having general reference numeral 10. The protective cover 10 is illustrated positioned above a vehicle's front windshield 12 and ready for attachment thereto. The windshield 12 is shown as part of a standard four-door sedan or vehicle 14. Obviously, the vehicle 14 can be of various makes of automobiles, pickup trucks and other vehicles. The vehicle 14 includes front doors 16, a hood 18, windshield wipers 20, and a windshield wiper well 22

The protective cover 10 includes a flexible, exterior, windshield cover member 24 dimensioned to cover the exterior of the vehicle's windshield 12. The cover member 24 has a length "L" in a range of 60 to 84 inches and a width "W" in a range of 30 to 48 inches. The cover member 24 includes a top portion 26, a bottom portion 28, a first side portion 30 and a second side portion 32. A pair of flexible, interior wings 34 are hinged along a fold line 36 attached to the first and second side portions 30 and 32 of the cover member 24. The interior wings 34 include a pair of elastic loops 38. When the front doors 16 of the vehicle 14 are opened, the wings 34 are inserted inside the vehicle with the elastic loops 38 attached to windshield visor posts 40 for holding the cover member 24 securely against the windshield 12 in tension. This feature of the attachment of the loops 38 to the visor posts 40 is shown in FIG. 4.

A windshield wiper well cover 42 is hinged along a fold line 44 attached to the bottom portion 28 of the cover member 24. The well cover 42 is releasably secured to a portion of the vehicle's hood 18 using a plurality of magnets 46. The well cover 42 is used to cover the windshield wipers 20 in a wiper well 22 and prevent snow and ice from gathering therein, when the vehicle 14 is parked outside during winter.

Another feature of the subject protective cover is the use of one or more information pockets 48 with transparent cover in the top portion 26 of the cover member 24. The information pockets 48 are used for receiving an official notice 50 or card therein for indicating the vehicle 14 is used by a city, state or federal official, a policeman, a fireman, or a handicap person. In this drawing, two of the pockets 48 are shown on opposite sides of the top portion 26 of the cover member 24. Also and preferably, a single information pocket 48, shown in dashed lines, is centered on the top portion 26. By centering the single pocket 48 on the cover member 24, the official notice 50 will be difficult to reach and less likely to be stolen from inside the pocket.

Figure 2:
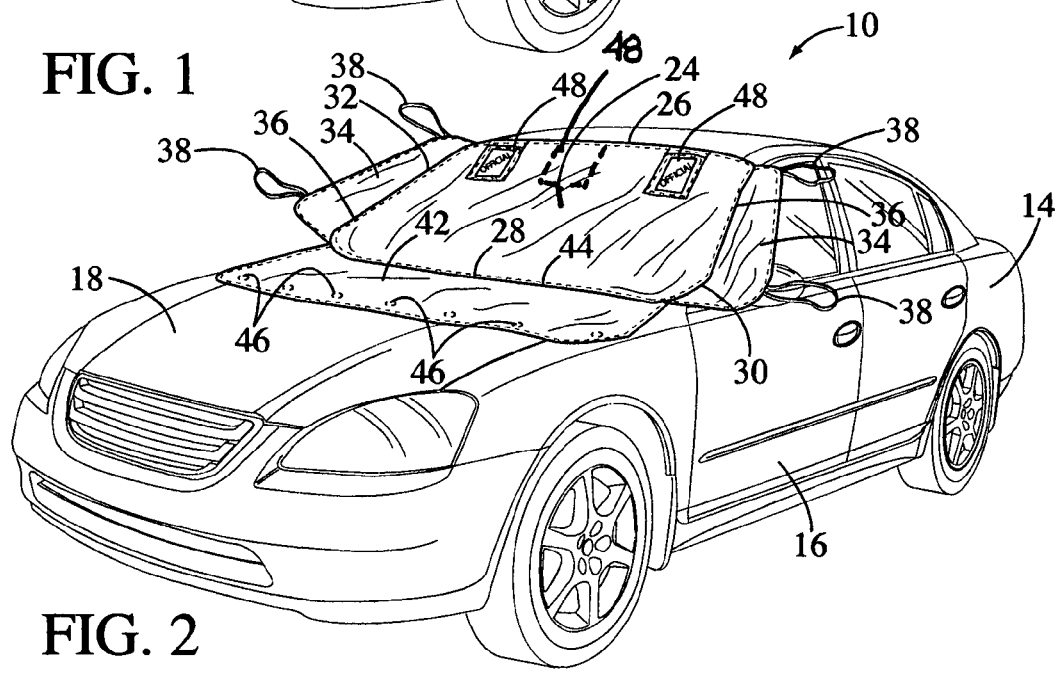
FIG. 2 is another perspective view of the protective cover with a cover member received on top of the windshield and a foldable windshield wiper well cover covering the vehicle's windshield wiper and wiper well and attached to a portion of the vehicle's hood.

In FIG. 2, another perspective view of the protective cover 10 is illustrated. In this drawing, the cover member 24 is received on top of the windshield 12. The foldable windshield wiper well cover 42 is shown covering the vehicle's windshield wipers 20 and the wiper well 22 and attached to a portion of the vehicle's hood 18 using the magnets 46.

In FIG. 3, another perspective view of the protective cover 19 is shown with the pair of foldable, interior wings 34, shown in dashed lines, received inside the vehicle. By opening the front doors 16, the wings 34 are folded along fold lines 36 inwardly approximately 180 degrees inside the vehicle and next to the inside of the windshield 12.

In FIG. 4, a perspective view from inside the vehicle 14 is shown illustrating the interior of the vehicle 34. The elastic loops 38 are shown received around the visor posts 40. The elastic loops 38 hold the wings 34 tightly against the inside of the windshield 12 and in turn hold the cover member 24 in tension against the outside of the windshield 12.

In FIG. 5, a perspective view of the protective cover 10 is illustrated showing how the hinged flexible wings 34 and the wiper well cover 42 are folded, as indicated by arrows 51, on top of a portion of the cover member 24 prior to winding the protective cover 10 into a compact roll for storage.

In FIG. 6, a perspective view of the flexible protective cover 10 is shown wound into a roll and held in place using the elastic loops 38. In this drawing, a portion of the cover member 24 is cutaway and folded back to illustrate a 2 or 4 ply material making up the cover 10. The material can include an outside, sun reflective material 52 make of a reflective metal foil and the like and an interior fabric layer 54. The fabric layer 54 can be made of various thicknesses for adding insulation qualities to the protective cover 10.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. An exterior vehicle windshield protective cover adapted for covering the outside of a front windshield of a vehicle, the vehicle including front doors, a door hood, windshield wipers disposed in a wiper well and windshield visor posts mounted inside the vehicle, the protective cover reflects the sun's ray in the summer to help keep the vehicle cool and protects the windshield from snow and ice when the vehicle is parked outside during winter, the protective cover, when not in use, adapted for winding into a compact roll for storage, the protective cover comprising:

a flexible, exterior windshield cover member adapted for and dimensioned to cover the exterior of the vehicle's windshield, the cover member including a top portion, a bottom portion, a first side portion and a second side portion;

a flexible, first interior wing, one side of the first interior wing disposed next to the first side portion of the cover member, the first interior wing used to hold the first side portion of the cover member in place on the windshield;

a first wing fold line attached to and disposed between one side of the first interior wing and the first side portion of the cover member, the first wing fold line used to fold the first interior wing next to a first side portion of an inside of the windshield when one of the front doors is opened, the first wing fold line used to fold the first interior wing on top of the first side portion of the cover member prior to the cover member being wound into the compact roll for storage;

a flexible, second interior wing, one side of the second interior wing disposed next to the second side portion of the cover member, the second interior wing used to hold the second side portion of the cover member in place on the windshield;

a second wing fold line attached to and disposed between one side of the second interior wing and the second side portion of the cover member, the second wing fold line used to fold the second interior wing next to the second side portion of the inside of the windshield when another of the front doors is opened, the second wing fold line used to fold the second interior wing on top of a second side portion of the cover member prior to the cover member being wound into the compact roll for storage; and a windshield wiper well cover disposed along a length of the bottom portion of the cover member, the wiper well cover adapted for covering the window well and a portion of the hood;

a wiper well cover fold line attached to and disposed between the bottom portion of the cover member and the wiper well cover and along a length thereof, the wiper well cover fold line used to fold the wiper well cover over the windshield wipers, wiper well and the portion of the door hood, the wiper well cover fold line used to fold the wiper well cover on top of the bottom portion of the cover member prior to the cover member being wound into the compact roll for storage; and a plurality of magnets disposed along a length of the wiper well cover and attached thereto, the magnets used for engaging the portion of the hood and holding the wiper well cover in place on the hood.

2. The protective cover as described in claim 1 further including a first pair of elastic loops attached to an opposite side of the first interior wing and a second pair of the elastic loops attached to an opposite side of the second interior wing, one of the first pair of elastic loops and one of the second pair of elastic loops adapted for and attached to the windshield visor posts for holding the cover member securely against the windshield in tension.

3. The protective cover as described in claim 1 wherein the first and second interior wings are folded on the first and second wing fold lines approximately 180 degrees when folded inside the vehicle and next to the inside of the windshield.

4. The protective cover as described in claim 1 further including at least one pocket with transparent cover mounted in the top portion of the cover member, the pocket adapted for receiving various types of official notices therein.

5. The protective cover as described in claim 1 wherein the cover member has a length "L" in a range of 60 to 84 inches and a width "W" in a range of 30 to 48 inches for covering various types of vehicle windshields.

6. The protective cover as described in claim 1 wherein the cover member includes an exterior sun reflective material and an interior fabric material for adding insulation to the protective cover.

7. The protective cover as described in claim 1 further including at plurality of pockets with transparent covers mounted in the top portion of the cover member, the pockets adapted for receiving various types of official notices therein.

8. An exterior vehicle windshield protective cover adapted for covering the outside of a front windshield of a vehicle, the vehicle including front doors, a door hood, windshield wipers disposed in a wiper well and windshield visor posts mounted inside the vehicle, the protective cover reflects the sun's ray in the summer to help keep the vehicle cool and protect the windshield from snow and ice when the vehicle is parked outside during winter, the protective cover, when not in use, adapted for winding into a compact roll for storage, the protective cover comprising:
- a flexible, exterior windshield cover member adapted for and dimensioned to cover the exterior of the vehicle's windshield, the cover member including a top portion, a bottom portion, a first side portion and a second side portion;
- a flexible, first interior wing, one side of the first interior wing disposed next to the first side portion of the cover member, the first interior wing used to hold the first side portion of the cover member in place on the windshield;
- a first wing fold line attached to and disposed between one side of the first interior wing and the first side portion of the cover member, the first wing fold line used to fold the first interior wing next to a first side portion of an inside of the windshield when one of the front doors is opened, the first wing fold line used to fold the first interior wing on top of the first side portion of the cover member prior to the cover member being wound into the compact roll for storage;
- a flexible, second interior wing, one side of the second interior wing disposed next to the second side portion of the cover member, the second interior wing used to hold the second side portion of the cover member in place on the windshield;
- a second wing fold line attached to and disposed between one side of the second interior wing and the second side portion of the cover member, the second wing fold line used to fold the second interior wing next to a second side portion of the inside of the windshield when another of the front doors is opened, the second wing fold line used to fold the second interior wing on top of the second side portion of the cover member prior to the cover member being wound into the compact roll for storage; and
- a windshield wiper well cover disposed along a length of the bottom portion of the cover member, the wiper well cover adapted for covering the window well and a portion of the hood;
- a wiper well cover fold line disposed between the bottom portion of the cover member and the wiper well cover and along a length thereof, the wiper well cover fold line used to fold the wiper well cover over the windshield wipers, wiper well and the portion of the door hood, the wiper well cover fold line used to fold the wiper well cover on top of the bottom portion of the cover member prior to the cover member being wound into the compact roll for storage;
- a plurality of magnets disposed along a length of the wiper well cover and attached thereto, the magnets used for engaging the portion of the hood and holding the wiper well cover in place on the hood; and
- a first pair of elastic loops attached to and spaced apart on an opposite side of the first interior wing, the elastic loops received around the cover member for holding the cover member in a compact roll for storage.

9. The protective cover as described in claim 8 further including a second pair of the elastic loops spaced apart and attached to an opposite side of the second interior wing, one of the first pair of elastic loops and one of the second pair of elastic loops adapted for and attached to the windshield visor posts for holding the cover member in tension against the windshield.

10. The protective cover as described in claim 8 wherein the first and second interior wings are folded on the first and second wing fold lines approximately 180 degrees when folded inside the vehicle and next to the inside of the windshield.

11. An exterior vehicle windshield protective cover adapted for covering the outside of a front windshield of a vehicle, the vehicle including front doors, a door hood, windshield wipers disposed in a wiper well and windshield visor posts mounted inside the vehicle, the protective cover reflects the sun's ray in the summer to help keep the vehicle cool and protect the windshield from snow and ice when the vehicle is parked outside during winter, the protective cover, when not in use, adapted for winding into a compact roll for storage, the protective cover comprising:
- a flexible, exterior windshield cover member adapted for and dimensioned to cover the exterior of the vehicle's windshield, the cover member including a top portion, a bottom portion, a first side portion and a second side portion;
- a flexible, first interior wing, one side of the first interior wing disposed next to the first side portion of the cover member, the first interior wing used to hold the first side portion of the cover member in place on the windshield;
- a first wing fold line attached to and disposed between one side of the first interior wing and the first side portion of the cover member, the first wing fold line used to fold the first interior wing approximately 180 degrees next to a first side portion of an inside of the windshield when one of the front doors is opened, the first wing fold line used to fold the first interior wing on top of the first side portion of the cover member prior to the cover member being wound into the compact roll for storage;
- a flexible, second interior wing, one side of the second interior wing disposed next to the second side portion of the cover member, the second interior wing used to hold the second side portion of the cover member in place on the windshield;

a second wing fold line attached to and disposed between one side of the second interior wing and the second side portion of the cover member, the second wing fold line used to fold the second interior wing approximately 180 degrees next to a second side portion of the inside of the windshield when another of the front doors is opened, the second wing fold line used to fold the second interior wing on top of the second side portion of the cover member prior to the cover member being wound into the compact roll for storage; and a windshield wiper well cover disposed along a length of the bottom portion of the cover member, the wiper well cover adapted for covering the window well and a portion of the hood;

a wiper well cover fold line disposed between the bottom portion of the cover member and the wiper well cover and along a length thereof, the wiper well cover fold line used to fold the wiper well cover over the windshield wipers, wiper well and the portion of the door hood, the wiper well cover fold line used to fold the wiper well cover on top of a portion of the cover member prior to the cover member being wound into the compact roll for storage;

a plurality of magnets disposed along a length of the wiper well cover and attached thereto, the magnets used for engaging the portion of the hood and holding the wiper well cover in place on the hood;

a first pair of elastic loops attached to and spaced apart on an opposite side of the first interior wing, the elastic loops received around the cover member for holding the cover member in a compact roll for storage;

a second pair of the elastic loops spaced apart and attached to an opposite side of the second interior wing, one of the first pair of elastic loops and one of the second pair of elastic loops adapted for and attached to the windshield visor posts for holding the cover member in tension against the windshield; and at least one pocket with transparent cover mounted in the top portion of the cover member, the pocket adapted for receiving various types of official notices therein.

* * * * *